United States Patent [19]
Watson

[11] Patent Number: 5,173,882
[45] Date of Patent: Dec. 22, 1992

[54] SONAR SYSTEM FOR AND METHOD OF ARCTIC SEAFLOOR RECONNAISSANCE

[76] Inventor: William D. Watson, 2440 E. Tudor, #1141, Anchorage, Ak. 99507

[21] Appl. No.: 862,076

[22] Filed: Apr. 2, 1992

[51] Int. Cl.$^5$ ............................................. G01S 15/00
[52] U.S. Cl. ........................................ 367/104; 367/88
[58] Field of Search .................................. 367/104, 88

[56] References Cited
U.S. PATENT DOCUMENTS

| | | | |
|---|---|---|---|
| 3,553,638 | 1/1971 | Sublett | 367/104 |
| 4,935,906 | 6/1990 | Baker et al. | 367/104 |

Primary Examiner—Daniel T. Pihulic
Attorney, Agent, or Firm—Heller, Ehrman, White & McAuliffe

[57] ABSTRACT

A sonar system for arctic seafloor reconnaissance has a pair of transducers affixed to a holder so as to form a transducer array. A vertically extended tube assembly rotatably supported by a tripod suspends this transducer array at a specified depth in water such that the transducer array is tilted at a specified tilting angle and oriented in a specified azimuthal direction. One of the transducers is made to emit directional acoustic signals and the reflected acoustic signals received by both of the transducers are converted into electrical signals. These signals are processed together with signals indicative of the tilting angle and the orientation of the transducer array to obtain seafloor imagery and depth data.

16 Claims, 6 Drawing Sheets

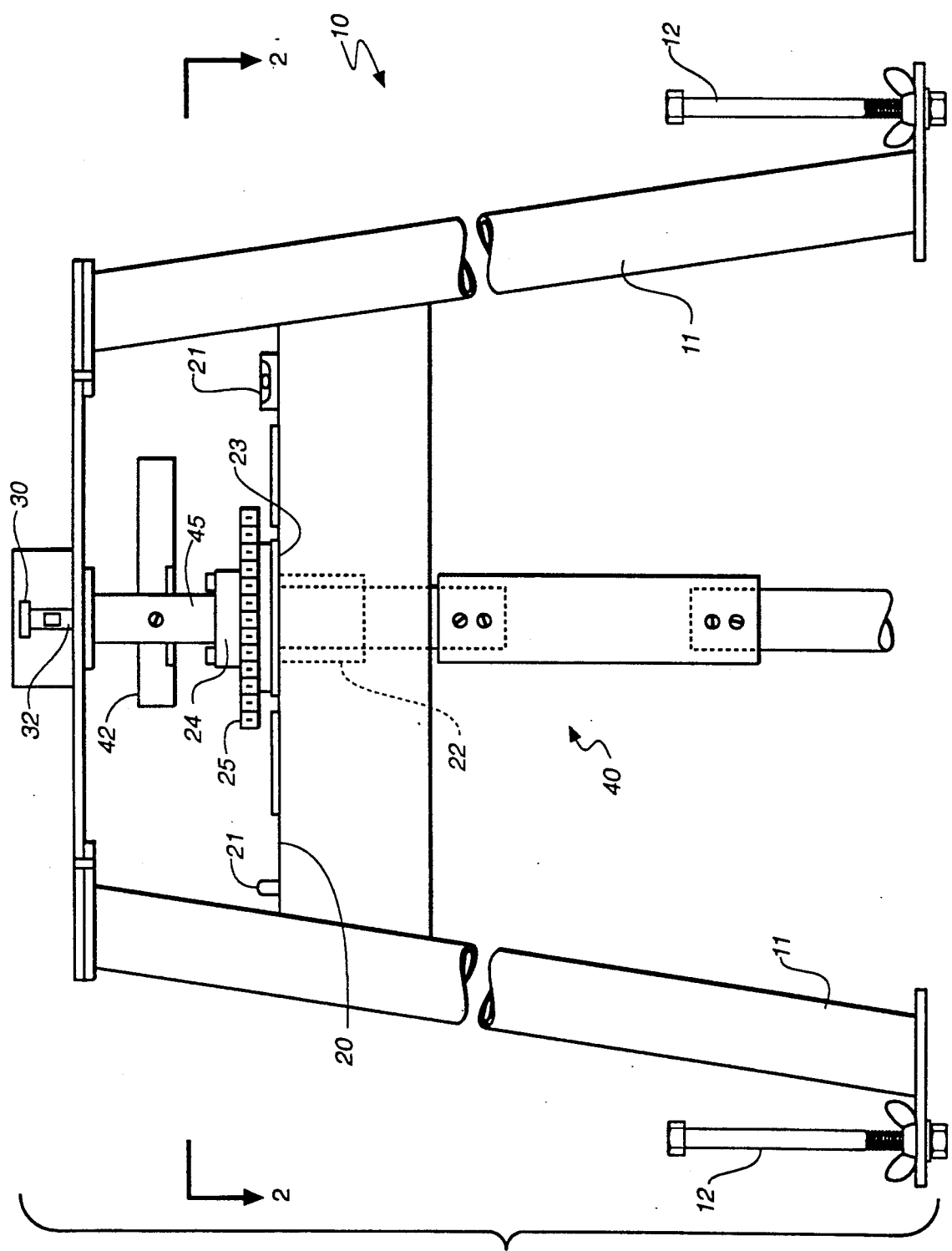
FIG._1

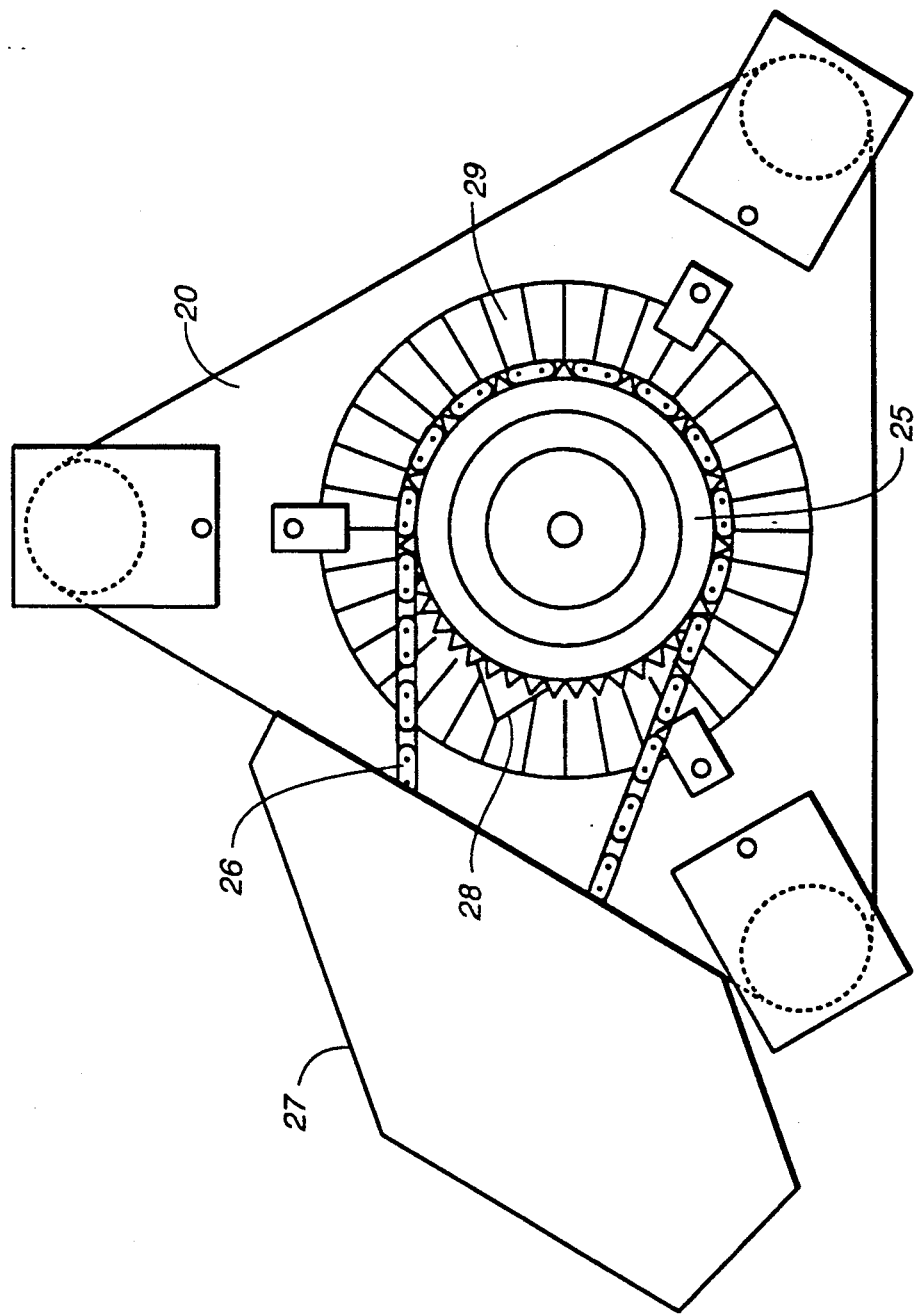
FIG._2

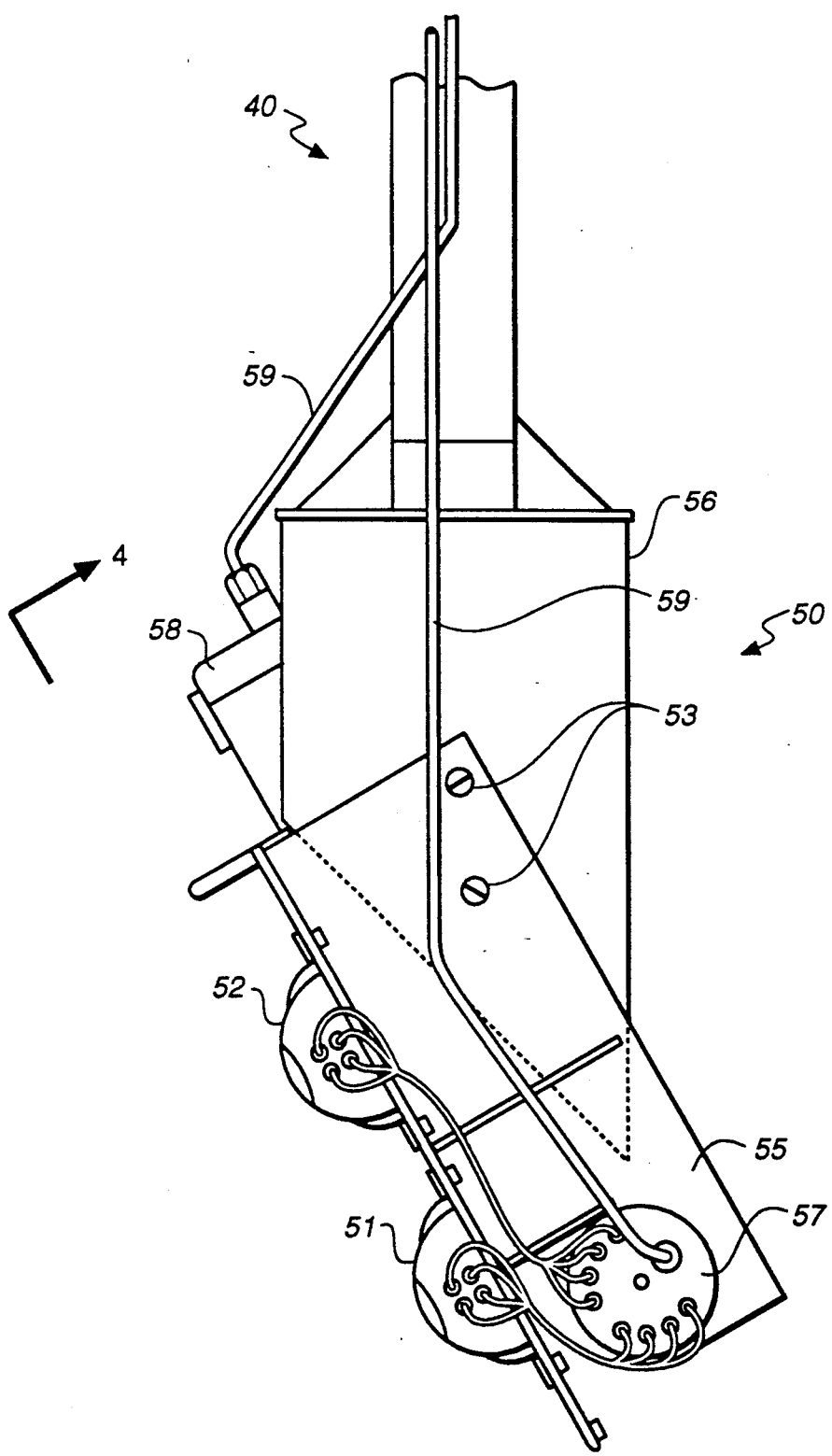
FIG._3

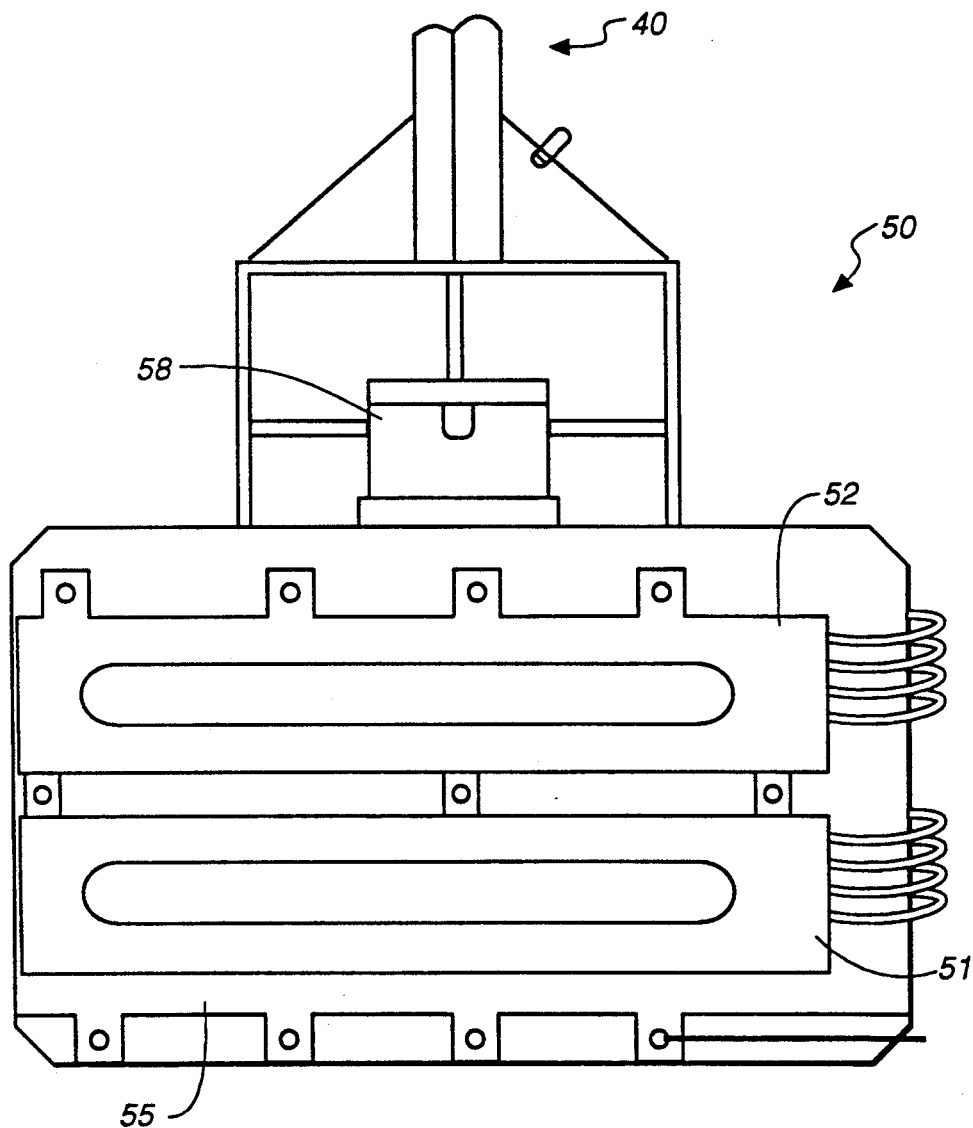
FIG._4

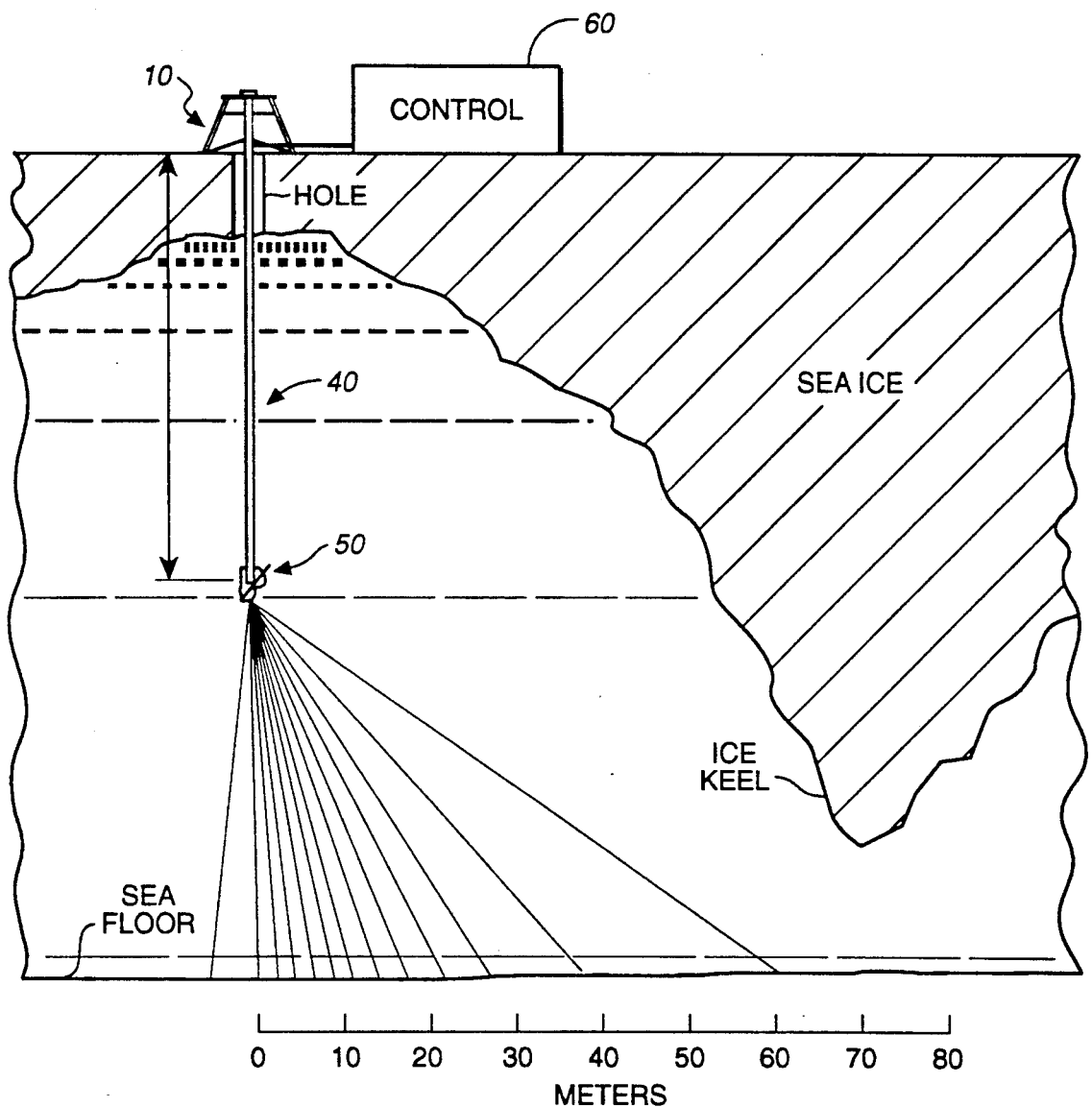
FIG._5

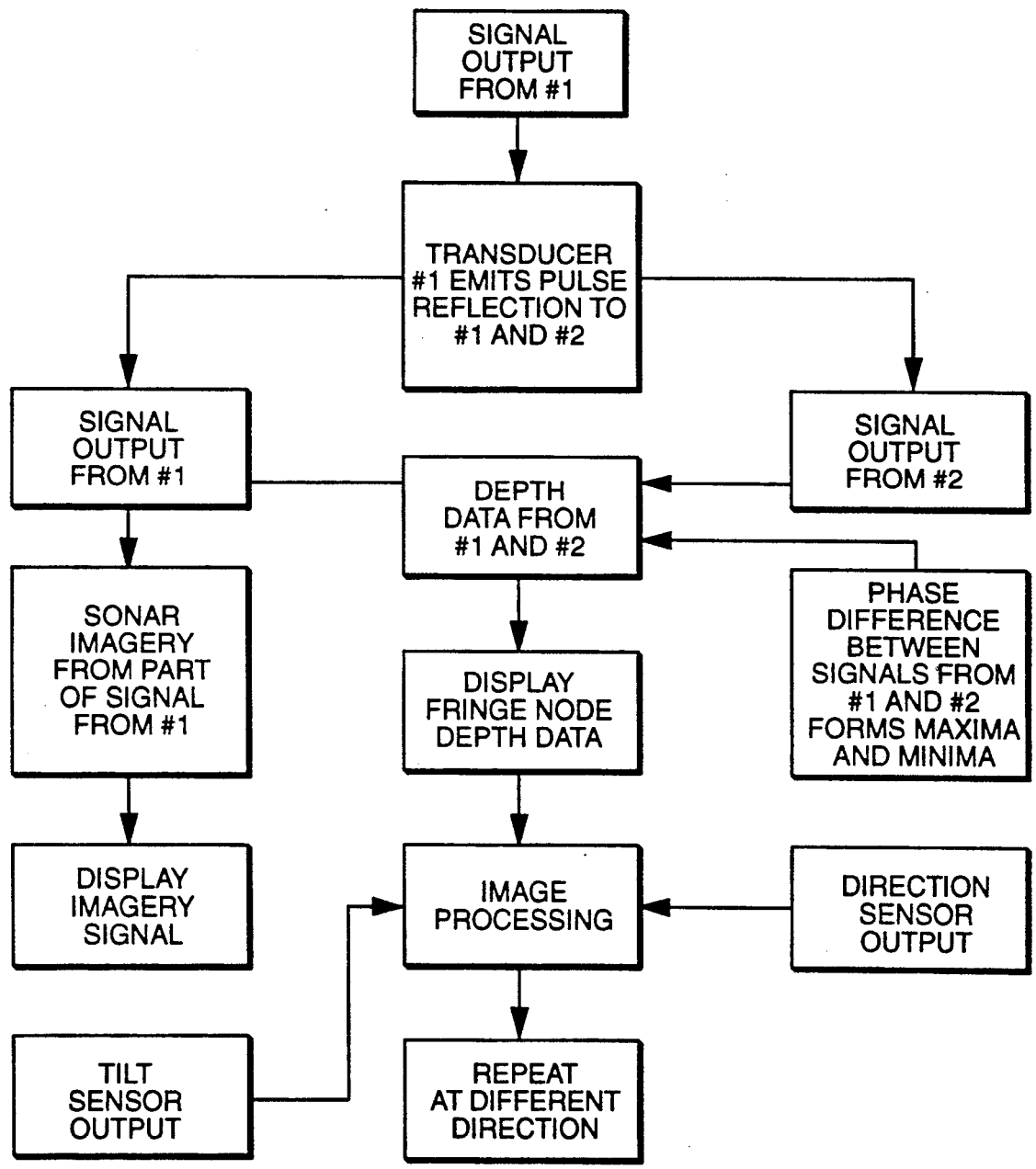
FIG._6

SONAR SYSTEM FOR AND METHOD OF ARCTIC SEAFLOOR RECONNAISSANCE

BACKGROUND OF THE INVENTION

This invention relates to a system for arctic seafloor reconnaissance and a method of using such a system to collect imagery and depth data. More particularly, this invention relates to a relatively lightweight system for collecting high quality sonar data on topographic features of arctic seafloor and a method of using such a system.

In the Arctic, bottom-founded structures of all types require a site-specific investigation to determine hazards, bathymetry, and soil characteristics, but the sea is predominantly covered by permanent pack ice in an environment of extremes with ambient temperatures ranging from −70° F. in the winter to 80° F. in the brief summer period. During the short summer, a narrow window of open water opportunity may allow conventional methods of seafloor reconnaissance, but the period of ice-free open water varies from year to year, subject to the influence of many factors such as strong southerly winds, effects of heat and surging water levels. In addition, the costs of such conventional seafloor investigation are high, and the task is frequently not completed due to adverse ice conditions.

This has led to attempts at site investigations during the Arctic spring when the ice pack is principally a frozen mass of manageable tendencies. With the suitability that the Arctic spring ice pack provides, however, there are still many problems to be overcome. For example, one of prior art attempts may be characterized by the use of a standard surveyor's tripod with an attached towfish which is lowered through a hole made in the ice. From the surface, technicians grip lines which are attached to the towfish and walk in circles to reorient the transducers attached to the towfish. More recently, attempts were made to place a diver on the seafloor holding a towfish as he slowly rotated. Still another attempt consisted of an operation of cutting slots through the ice and towing a side-scan sonar towfish from the ice surface. Highly accurate data cannot be expected from such a towed system which uses a dynamic method with a towed body rolling and pitching. In summary, these prior art operations do not yield acceptably accurate results, and are very costly in both time expended and total resources required.

SUMMARY OF THE INVENTION

It is therefore an object of the present invention to provide a relatively inexpensive apparatus for and method of high-precision seafloor reconnaissance.

It is another object of the invention to provide a relatively lightweight sonar seafloor mapping system which can be easily assembled and operated even in a severe arctic environment.

A sonar system for arctic seafloor reconnaissance embodying the present invention, with which the above and other objects can be accomplished, may be characterized as comprising a pair of transducers affixed to a holder so as to form a transducer array and a vertically extended tube assembly rotatably supported by a tripod suspending this transducer array at a specified depth in water. The transducer array is tilted at a specified tilting angle and its azimuthal orientation can be changed by rotating the tube assembly. A tilt sensor is attached to the holder and transmits a signal indicative of this tilting angle. One of the transducers is caused to emit directional acoustic signals and the reflected signals received by both of the transducers are converted into electrical signals. These signals are processed in combination with signals indicative of the tilting angle and the orientation of the transducer array to obtain seafloor imagery and depth data.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a side view of a portion of a sonar system embodying the present invention including its tripod structure;

FIG. 2 is a plan sectional view of the tripod structure of FIG. 1 taken along the line 2—2 of FIG. 1;

FIG. 3 is a side view of the transducer assembly of the sonar system of FIGS. 1 and 2;

FIG. 4 is a front view of the transducer head taken along the line 4—4 in FIG. 3;

FIG. 5 is a schematic drawing for illustrating the sonar system of FIGS. 1-4 emitting and receiving acoustic signals for seafloor reconnaissance and demonstrating fringe nodes; and FIG. 6 is a flow diagram showing a data acquisition cycle in the operation of the system shown in FIGS. 1-5.

DETAILED DESCRIPTION OF THE INVENTION

Described broadly, a sonar system embodying the invention consists essentially of a tripod structure 10 shown in FIGS. 1 and 2, a transducer assembly 50 comprising a transducer array as shown in FIGS. 3 and 4, and a control unit 60 shown only schematically in FIG. 5 including a sonar console (such as produced by EG&G Environmental Equipment, Waltham, Mass.) for controlling the entire operation of the system including acquisition and processing of data. In view of the harsh environmental conditions in which the system is to operate, efficiency and durability considerations require that the system be relatively light and can be easily assembled and deployed by one or two persons. For this reason, commonly available aluminum pipes (with outer diameter of, say, 2⅜ inches) are used as leg pieces 11 of the tripod structure 10 supporting a table 20. Since a level work site is not available in many instances at a specific survey location, 8-inch leveling rods 12 are inserted into the feet of these leg pieces 11. In order to visually verify that the tripod 10 is level horizontally, a pair of machinist's levels 21 of ordinary bubble-in-tube type are installed on the table 20 in mutually perpendicular directions.

The purpose of the tripod table 20 is to support the transducer assembly 50 at a desired depth in water below and in a desired azimuthal orientation. As will be explained below more in detail, the transducer assembly 50 is suspended at the lower end of a vertically extended pipe assembly 40 comprising a plurality of 2-inch aluminum pipes of 5 feet in length each and match-drilled to assure proper tolerance. In order to rotatably support this pipe assembly 40, the tripod table 20 is provided with a collared flange 22 with an annular teflon bushing 23 thereon. A top section 45 of the pipe assembly 40 is attached to a drive sprocket 25 by a swage collar 24. The sprocket 25 is in power-communicating relationship with a motor (inside a motor housing shown at 27) through a chain 26. The driving mechanism, thus formed for the top tube section 45 and hence for the rotary motion of the entire tube assembly 40, sits on the bushing 23. The bushing 23 serves to allow ease of rotation, and its material makes it insensitive to cold weather to which it is exposed.

For system orientation, a hand level 42 is inserted into the top tube section 45, secured thereto by means of stainless steel set screws above the sprocket 25 and the chain 26 of the driving mechanism. The hand level 42 is preferably of a kind with objective and eyepiece lenses mounted slidably for easy focusing such as Model 8042-60 of Lietz. To index the system to a given bearing, the hand level 42 is sighted at a survey stake or the like in the distance at a recorded bearing. Below the hand level 42, there is an index indicator 28 adapted to point in the same azimuthal direction as the transducer array. An annular plate 29 of stainless steel, engraved as a compass rose with 360 increments for individual degrees in a circle, is located on the tripod table 20 below the sprocket 21.

Placed above the top tube section 45 for precisely detecting its orientation is a heading sensor 30 comprising a heading sensor potentiometer (such as Beckman Industrial Series 5610) of a single-turn wire-wound type which resets after each complete revolution and has an accuracy of better than 0.1 degree. A shaft encoder interface 32, which is precision-machined out of a solid block of aluminum, is inserted into and bolted to the top tube section 45 and engages with the potentiometer. The compass rose 29 is manually adjustable to "ground truth" the output of the heading sensor.

As shown in FIGS. 3 and 4, the transducer array comprises two sonar transducers which will be hereinafter referred to as a first (or lower) transducer 51 and a second (or upper) transducer 52 for the convenience of explanation. They are mounted to a transducer head 55, spaced apart from each other by 10 wavelengths (in water). The head 55 is rotatably supported by a mounting member 56 which is securely attached to the bottom section of the pipe assembly 40. The angle, by which the head 55 is tilted from the vertical, is variable from 20 degrees to 45 degrees in increments of 5 degrees by adjusting two of stainless steel cap screws 53 between the transducer head 55 and the mounting member 56. If the site of investigation is in an area where surface backscatter is a problem, the interference may be minimized by increasing the tilting angle. Where ice keels can present a problem, this option can be a significant advantage both for data acquisition and interpretation.

The transducer head 55 also supports transducer electronics (inside an electronics housing 57) and a tilt sensor (inside a tilt sensor housing 58) for detecting the angle by which the head 55 is tilted from the vertical. Use as the tilt sensor may be made of Model CP17-1101-1 of Humphrey Inc. (of San Diego, Calif.), having a precision of 0.1 degree. Both these housings 57 and 58 for the transducer electronics and the tilt sensor, as well as the transducers 51 and 52 themselves, are rated to a water depth of 2000 feet. Cables 59 that transmit data to the surface are waterproof and made to withstand harsh environmental conditions.

With a sonar system thus structured, a data acquisition cycle starts with the control unit 60 causing a 750-volt DC pulse to travel down the cable 59 along the pipe assembly 40 to excite the lower transducer 51, thereby causing it to emit a directional 0.1-millisecond output pulse with an acoustic output power of 228 dB, referenced at one micropascal, at one meter. The horizontal beam width is 1.2 degrees (3 dB points) and the vertical beam width is 50 degrees, tilted downward by 30 degrees. With the horizontal beam width of only 1.2 degrees (3 dB points), greater target resolution and definition can be achieved than previously possible. The data acquisition rate is about seven pings per second for a 50-meter range scale data and 3 pings per second for 200-meter range scale. The transmit pulse ping rate may be reduced if backscattering becomes a problem. The bathymetry data in 20 meters of water is only usable for approximately 50 meters away when the transducers are at 30 degrees from the horizontal. This has to do more with the geometry of the interferometry data than with any other factor.

With reference to the flow diagram of FIG. 6, the acoustic echoes received by the two transducers 51 and 52 are converted to electrical signals, and each transducer signal is sent to a discrete transducer board within the electronics housing 57. A part of the signal from the lower transducer 51 is used by the sonar console of the control unit 60 for imagery. At the same time, depth data are obtained by interferometric techniques from parts of signals from both the lower and upper transducers 51 and 52. As schematically shown in FIG. 5, the signal outputs from the two transducers 51 and 52 are summed such that maxima (fringe nodes) are produced where the incoming waves are in phase, and minima (that is, a null) are produced where the waves are 180 degrees out of phase. The interference pattern effectively turns the two incoming waves into multiple narrow beams, or fringe nodes. In practice, six to eight fringe nodes are usable after data reduction. The series of fringe nodes represent the direct distance, or the slant range, to where each successive beam reaches and is reflected by the seafloor. The interferometry data are summed, that is, the outputs from the two transducers 51 and 52 are added by an electronics board (produced by Watson Co., Anchorage, Ak.) located in the sonar console. The fringe nodes are printed on one channel of the sonar console and the image data on another channel. They are stored within the control unit 60 together with the inputs from the tilt sensor 58 and the heading sensor 30. The tilting angle detected by the tilt sensor 48 is also stored within the control unit 60 and can be monitored both in real time and playback on a menu screen (not shown).

The motor (within the housing 27), which powers the rotation of the transducer array, is a 115-volt variable speed electric motor such that the rotational speed of the transducer array is variable from 10 minutes per revolution to 2 revolutions per minute. For practical operation, the range scale of the sonar is variable from 50 meters to 200 meters, although it can be increased to 400 meters with diminished resolution. The rate of rotation is generally reduced for distant ranges. In order to assure proper orientation of the transducer array, an alignment line may preferably be drawn in red on each individual pipe of the pipe assembly 40. The line may continue to the top tube where the index indicator 28 is set by the hand level 42. The control unit 60 also serves to store the heading information.

The number of pipes in the pipe assembly 40 is determined by the water depth, range scale of the sonar, desired resolution of imagery, required range of bathymetry and local conditions. In most cases, data are acquired at more than one altitude above the seafloor in order to obtain as much information to be interpreted as possible. To change the altitude of the transducer array above the seafloor, the individual pipes are added or taken off by wrapping a nylon strap around the topmost pipe and securing it to a platform (not shown) above the tripod. A second nylon strap is then affixed to the pipe below and an electric winch mechanism (not shown) may be used to trip the pipe from the pipe assembly 40.

The present invention has been described above by way of only a single example, but the example described above is intended to be illustrative, and not limitative. In particular, it is to be remembered that the drawings are largely intended to be schematic, and not to describe preferred shapes or relative positional relationships of various components. Many modifications and variations may be effected within the scope of the present invention, which not only allows seafloor data to be collected accurately but also enables one to process such data in combination with information on the tilting and azimuthal angles at which they are collected. Such modifications and variations that may be apparent to a person skilled in that art are intended to be within the scope of the invention.

What is claimed is:

1. A sonar system for arctic seafloor reconnaissance comprising:
   a pair of transducers affixed to a holder so as to form a transducer array;
   a mounting member rotatably supporting said holder such that said transducer array can be kept tilted at a specified tilting angle with respect to the vertical direction;
   a vertically extending tube assembly, said mounting member being affixed to a lower end portion of said tube assembly;
   a supporting structure for rotatably supporting an upper end portion of said tube assembly such that said tube assembly can rotate around a vertical axis;
   control means for causing one of said transducers to emit directional acoustic signals and converting reflected acoustic signals received by said transducers into electrical signals.

2. The sonar system of claim 1 further comprising a tilt sensor adapted to output a tilt signal indicative of the tilting angle of said transducer array, said control means being programmed to receive said tilt signal and to incorporate said tilt signal in processing said electrical signals to obtain imagery and depth data.

3. The sonar system of claim 2 wherein said tilt sensor is attached to said holder.

4. The sonar system of claim 2 further comprising a heading sensor attached to said upper end portion of said tube assembly and being adapted to output a direction signal indicative of the azimuthal orientation of said tube assembly, said control means being programmed to receive said direction signal and to incorporate said direction signal in processing said electrical signals to obtain said imagery and depth data.

5. The sonar system of claim 1 further comprising driving means for causing said tube assembly to rotate around said vertical axis.

6. The sonar system of claim 1 further comprising a hand level for viewing a distant reference object for positioning said supporting structure correctly at a selected site, said hand level being inserted through said upper end section of said tube assembly.

7. The sonar system of claim 1 wherein said supporting structure comprises a tripod which supports a table with level means installed thereon.

8. The sonar system of claim 1 wherein said tube assembly comprises a plurality of tubes which are mutually mated.

9. A method of arctic seafloor reconnaissance comprising the steps of:
   providing a transducer assembly having a pair of transducers affixed to a holder to form a transducer array;
   erecting a supporting structure;
   causing said supporting structure to suspend said transducer assembly at a specified depth in water below said supporting structure, maintaining said transducer array tilted by a specified tilting angle with respected to the vertical direction and oriented in a specified azimuthal direction;
   causing one of said transducers to emit directional acoustic signals; and
   converting reflected acoustic signals received by said pair of transducers into electrical signals.

10. The method of claim 9 wherein said transducer assembly is affixed to a lower end section of a vertically extended pipe assembly, said supporting structure rotatably supporting an upper end section of said pipe assembly.

11. The method of claim 10 further comprising the step of causing said pipe assembly to rotate around a vertical axis so as to change said azimuthal direction of said transducer array.

12. The method of claim 9 wherein said supporting structure is established on an ice surface and said pipe assembly passes through a vertical hole made in said ice surface.

13. The method of claim 9 further comprising the steps of providing a hand level through said upper end section of said pipe assembly and viewing a distant reference object through said hand level to select a position for establishing said supporting structure.

14. The method of claim 10 further comprising the step of obtaining imagery and depth data of seafloor by processing said electrical signals in combination with a tilt signal indicative of said tilting angle and a direction signal indicative of said azimuthal direction.

15. The method of claim 14 wherein said tilt signal is emitted from a tilt sensor attached to said transducer assembly and said direction signal is emitted from a heading sensor attached to said pipe assembly.

16. The method of claim 9 further comprising the steps of suspending said transducer array at another distance below said supporting structure to thereby change the depth of said transducer assembly and repeating the remaining steps.

* * * * *